D. T. LUCAS.
DITCH-DIGGING AND TILE-LAYING MACHINE.

No. 180,044.  Patented July 18, 1876.

WITNESSES:
W. W. Hollingsworth

INVENTOR:
David T. Lucas
BY
ATTORNEYS.

UNITED STATES PATENT OFFICE.

DAVID T. LUCAS, OF STOCKWELL, INDIANA.

IMPROVEMENT IN DITCH-DIGGING AND TILE-LAYING MACHINES.

Specification forming part of Letters Patent No. 180,044, dated July 18, 1876; application filed May 18, 1876.

*To all whom it may concern:*

Be it known that I, DAVID T. LUCAS, of Stockwell, in the county of Tippecanoe and State of Indiana, have invented a new and Improved Ditch-Digging and Tile-Laying Machine; and I do hereby declare that the following is a full, clear, and exact description of the same, reference being had to the accompanying drawing, forming part of this specification, in which—

Figure 1:
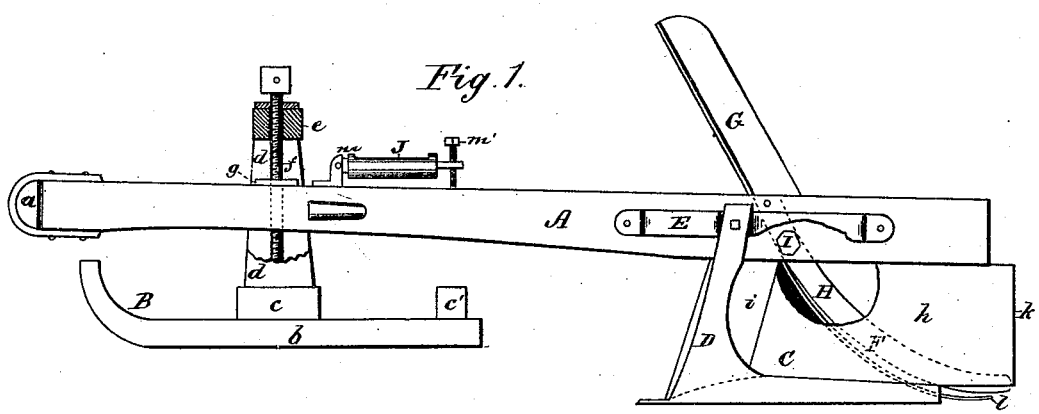
Figure 2:
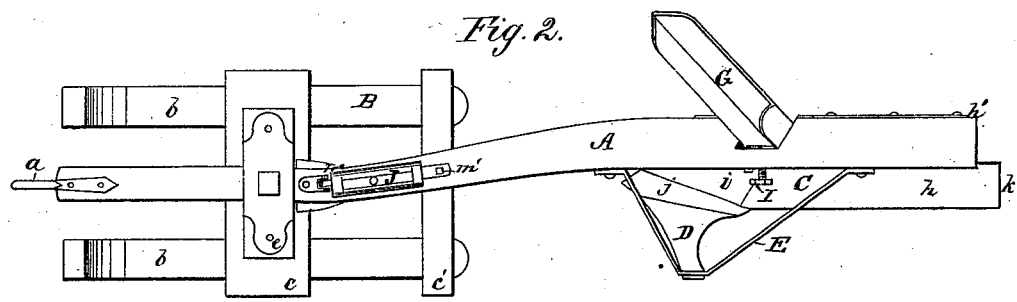
Figure 3:
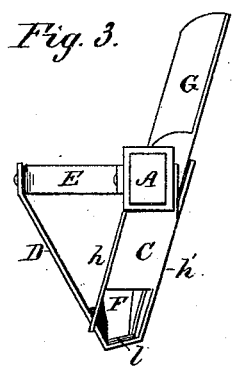
Figure 4:
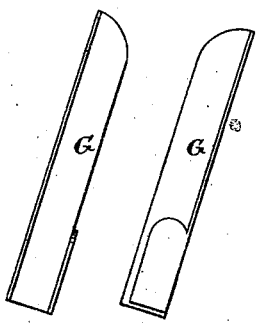

Figure 1 is a side elevation, partly in section. Fig. 2 is a plan view; Fig. 3, a rear-end view; Fig. 4, detail views of the trough-chute.

My invention relates to an improved construction of ditch-digging and tile-laying machine, designed to effect in one operation the opening of the earth and laying of sections of pipe or tile adjacent to each other, so as to form a continuous under-drain. The invention belongs to that class of machines in which a long beam is supported in front by a sled adjustably attached to said beam, so as to vary the elevation of the beam and depth of plowing devices, and having in the rear a plowing device with a chute, down which the tiles pass consecutively, to be laid in the open channel under ground one after the other.

My improvements consist, chiefly, in the particular construction and arrangement of the plowing devices, and of a supplemental chute or trough to facilitate the introduction of the tile, as hereinafter more fully described.

In the drawing, A represents the long draft-beam, which is slightly deflected laterally at the rear for the better accommodation of plowing devices, and is provided at the front extremity with a clevis or draft attachment, a. B is a sled, which supports and is adjustably fastened to the forward part of the beam A. This sled consists of two runners, b b, braced and held by cross-bars c c', upon the first and broader of which bars, c, are constructed two upright parallel standards, d d, united at the top by a cross-head, e. In between the standards d d the forward end of beam A passes, and is there held with a vertical adjustment upon a vertical screw-rod, f, which swivels in the cross-head e and cross-bar c. Said screw-rod passes directly through the beam, which latter is provided with a plate, g, to make a durable connection with the screw-threads, and terminates at the top in a squared end, perforated laterally with holes, into which a lever or wrench may be inserted to turn the screw-rod. By means of the adjustment just described the beam A is lowered or raised, and the plowing devices which it carries in the rear are made to make a deeper or shallower cut, which will vary in depth from eighteen to thirty inches, according to circumstances. C represents the plow proper, which consists of two parallel plates, $h\ h'$, of which $h$ forms the mold-board, and $h'$ the land-side, the front end of the plow being beveled or tapered at $i$, from the mold-board $h$ to the land-side $h'$, so as to leave the latter to form a cutting-edge. This plow C is attached to the beam by bolts or screws, and is set at an angle to the vertical plane, the lower edge projecting inwardly from the deflected rear end of the beam to the central line of the machine, so as to bring the draft-strain in alignment with the sled. D is a cutter-blade, which is fastened above to an angular brace, E, attached to the beam upon the inside of the rear bend, and is fastened below to the plow, adjacent to the bevel portion $i$, a point, $j$, being interposed between the two, which makes the horizontal cut at the bottom of the channel. The object of the cutter-blade D is twofold. In the first place it serves, with the cutting-edge of the plow, to cut out a complete section or slice of the earth, which causes the said earth to crumble sufficiently to fall back upon the laid tile and cover it up after the plow has passed, which would not be the case if the earth were simply pressed open by the plow, with compact walls. In the second place, also, the cutter-blade serves as a brace for the lower portion of the plow, which brace is required in this case by reason of the peculiar position of the plow, and serves, also, to make the aggregate resistance of the machine more in alignment with the draft. Through the central portion of the plow, between the sides $h\ h'$, is arranged a chute, F, which terminates horizontally at the bottom of the plow, and down which chute the tiles or sections of pipe pass consecutively into the opened channel to form a continuous under-drain. The upper portion of said chute is provided with a detachable supplemental chute or trough, G, which consists of a piece of metal bent longitudinally, so as to form the two sides of a trough, which is detachably fitted in the upper end of the chute and inclines forward and to one side, so as to allow the tiles to be fed to the chute continuously by being placed upon said trough laterally, from whence they slide down into the chute of their own gravity, in such a manner as to enable the operator to keep the chute always full, and thus insure the laying of the tile consecutively and in contact with each other. To adapt the chute F to different-sized tiles, I have arranged a spring, H, in the same, which forms one side of the chute, and against this spring is arranged a binding-screw, I, which passes through the side of the beam, and is adapted to project the spring laterally and enlarge or diminish the size of the chute to suit the size of the tile. The rear portion of the mold-board is extended at $k$ beyond the exit for the tile, so as to prevent the earth from falling in before the tile is in its proper position, and the lower part of the chute is also extended at $l$, to prevent the end of the tile from digging into the ground.

To regulate the fall or inclination of the tile when laid, so as to enable it to carry off the water properly, a level, J, is employed, which consists of an ordinary spirit-level, pivoted at one end, $m$, to the beam, and provided with an adjusting screw, $m'$, at the other end, by means of which arrangement the fall or grade of the under-drain may be accurately adjusted and regulated to suit the circumstances of the case.

The device, as thus described, is intended to be drawn by means of a windlass and rope attached to some immovable object, and it will be seen from the above description that the channel is dug, the tile laid continuously, and the grade regulated all in a single operation.

Having thus described my invention, what I claim as new is—

1. The plow C, consisting of parallel plates $h\ h'$, beveled at $i$, and arranged inclinedly, as described, in combination with point $j$, cutter-blade D, brace E, and beam A, substantially as and for the purpose described.

2. The combination, with the plow having chute F, of the spring H and binding-screw I, substantially as and for the purpose described.

3. The combination, with the beam A, deflected at its rear extremity, of the plow C, arranged as described, the cutter D, brace E, and sled B, adjustably attached to and supporting the forward end of the beam, substantially as and for the purpose described.

4. The combination, with the plow having chute F, of the detachable trough G, composed of a piece of metal bent longitudinally, and adapted to be used substantially as described.

In testimony whereof I have signed my name to this specification in the presence of two subscribing witnesses.

DAVID T. LUCAS.

Witnesses:
 ADAM O. BEHM,
 MARTIN LUCAS.